(No Model.)
J. J. FINMANT & J. J. NISSEN.
LEVEL ATTACHMENT.
No. 472,345. Patented Apr. 5, 1892.
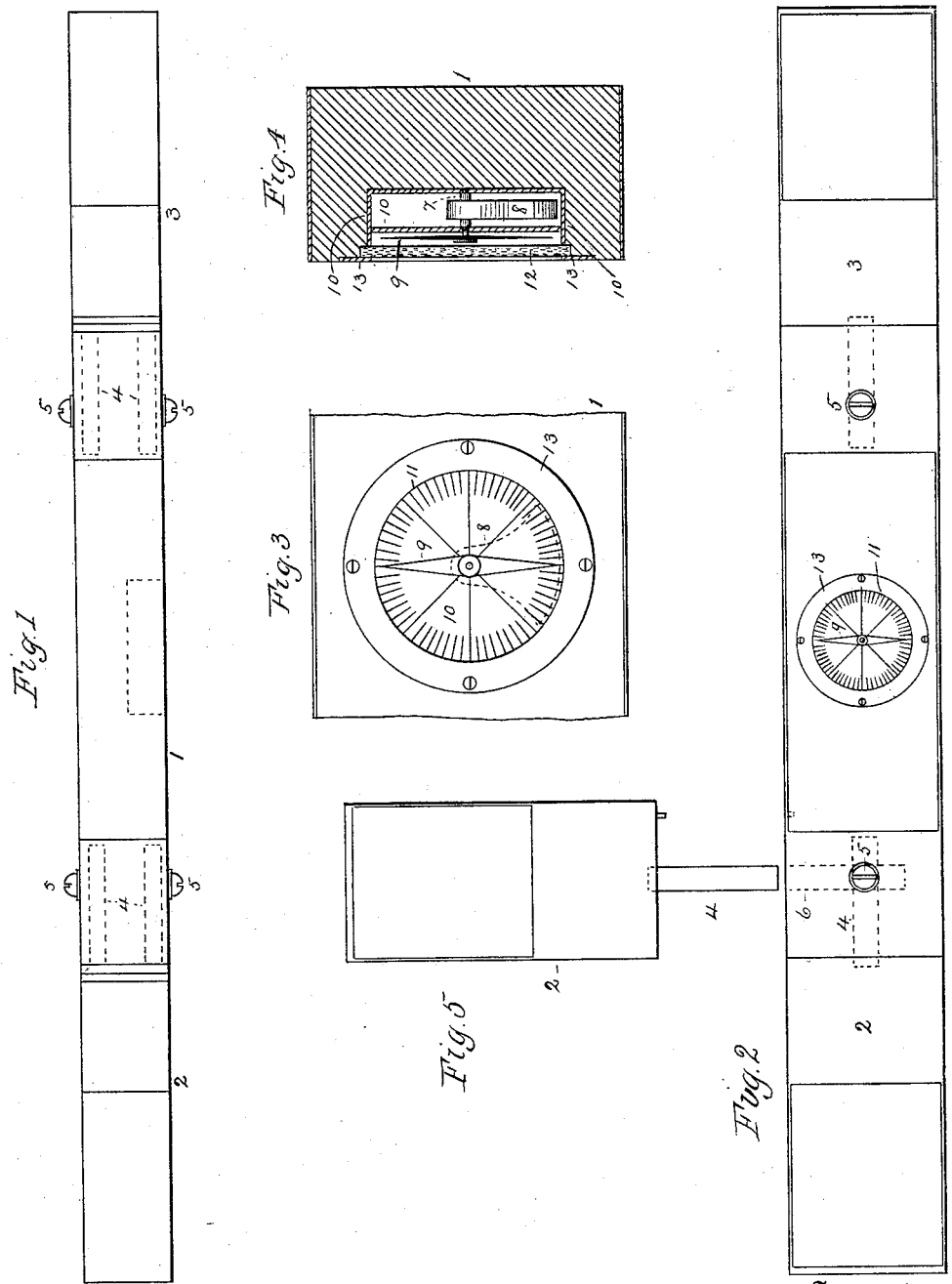
Witnesses
C. B. Martin
A. L. Jones.
Inventors:
John J. Finmant
John J. Nissen
By their Attorney
P. H. Gunckel

UNITED STATES PATENT OFFICE.

JOHN J. FINMANT AND JOHN J. NISSEN, OF HOPKINS, MINNESOTA.

LEVEL ATTACHMENT.

SPECIFICATION forming part of Letters Patent No. 472,345, dated April 5, 1892.

Application filed November 4, 1890. Serial No. 370,272. (No model.)

*To all whom it may concern:*

Be it known that we, JOHN J. FINMANT and JOHN J. NISSEN, citizens of the United States, residing at Hopkins, in the county of Hennepin and State of Minnesota, have jointly invented certain new and useful Improvements in Levels, of which the following is a specification.

Our invention relates to levels for ordinary use by mechanics and others.

The object of the invention is to produce a useful instrument that can be used in different positions to determine levels, angles, &c. This object is accomplished by the device illustrated in the accompanying drawings, in which—

Figure 1 is a plan view of one of the narrower sides of the instrument, and Fig. 2 a view of one of the broader sides. Fig. 3 is a like view of a portion of the instrument on an enlarged scale, showing the graduated leveling device. Fig. 4 is a central vertical section of the same, and Fig. 5 is a detached view of one of the end pieces of the instrument in position to be inserted to form a right-angled instrument or square.

In said drawings, 1 designates the body portion of the instrument; 2 and 3, respectively, the detachable end portions. These end portions are attached by means of tongues 4, that enter slots in the ends of the body portion and are secured by set-screws 5 or other convenient devices. One or both of these end portions may be arranged so as to be detached and secured at the side of the body portion at right angles thereto. The detachable portion 2 is shown in position for its tongues to enter lateral grooves 6 in the side of the body portion, and when so inserted either side of the angle, as will be obvious, may be used in connection with the leveling device provided in the body portion.

The leveling device consists, essentially, of a short shaft 7, on which are rigidly fixed a weight 8 and a pointer 9. These are preferably arranged in a box 10, inserted in the side of the body 1. On the outer face of the box are provided suitable graduations 11. The shaft 7 may have its bearings, as shown, in the back and front of the box. The pointer 9 is exterior to the box and free to rotate over the graduations. For the protection of the pointer and the plate a glass cover 12 is provided, and this may be secured by a flat ring 13, that is flush with the surface of the instrument-body.

The operation of the instrument is obvious from the description. The graduations 11 representing different degrees of a circle, the instrument can be used for a variety of purposes in determining levels, angles, &c. The detachable ends enable it to be shortened or lengthened, as desired, and when one of them is secured laterally to the body it will be apparent that the instrument can be used as a square as well as a level.

Having described our invention, what we claim, and desire to secure by Letters Patent, is—

In an instrument for determining levels, angles, &c., the combination, with a straight body having a graduated pendulum-level device embedded therein, of one or more detachable end pieces provided with means for connecting them to the body either in line therewith or at right angles thereto, substantially as set forth.

JOHN J. FINMANT.
JOHN J. NISSEN.

Witnesses:
A. L. JONES,
P. H. GUNCKEL.